United States Patent

[11] 3,561,403

| [72] | Inventors | Clifford D. Wilson, Jr.<br>406 S. Main;<br>Leland G. Wiseman, 506 Maple St.,<br>Conrad, Iowa 50621 |
|---|---|---|
| [21] | Appl. No. | 793,717 |
| [22] | Filed | Jan. 24, 1969 |
| [45] | Patented | Feb. 9, 1971 |

[54] AUTOMATIC LIQUID FEEDING APPARATUS
12 Claims, 8 Drawing Figs.

[52] U.S. Cl. ............................................. 119/51.11, 119/56
[51] Int. Cl. ......................................................... A01k 05/02
[50] Field of Search ........................................ 119/51.11, 52, 56, 51.5, 71; 222/70, 76

[56] References Cited
UNITED STATES PATENTS

| 3,208,431 | 9/1965 | Kloss | 119/51.11 |
| 3,265,036 | 8/1966 | Kloss | 119/51 |
| 3,313,272 | 4/1967 | Moloney | 119/51.11 |
| 3,330,255 | 7/1967 | Scott et al. | 119/51.11 |
| 3,331,357 | 7/1967 | Legrain et al. | 119/71 |
| 3,339,530 | 9/1967 | Gillette | 119/56 |
| 3,381,666 | 5/1968 | Bradshaw et al. | 119/51.11 |

Primary Examiner—Aldrich F. Medbery
Attorney—Henderson & Strom

ABSTRACT: This invention relates to an automatic liquid feeding apparatus comprising a trough means; a water inlet means directed into the trough means; and a feed hopper having feed outlet apertures formed therein disposed above the trough means. Feed is automatically dispensed into the trough means, at intervals, through the apertures in the feed hopper by an auger rotatably mounted in the feed hopper. The direction of rotation of the auger is changed between intervals to prevent bridging and packing of the feed. Water is also automatically dispensed through the water inlet means into the trough means. The liquid level in the trough means is controlled by a liquid level sensing means.

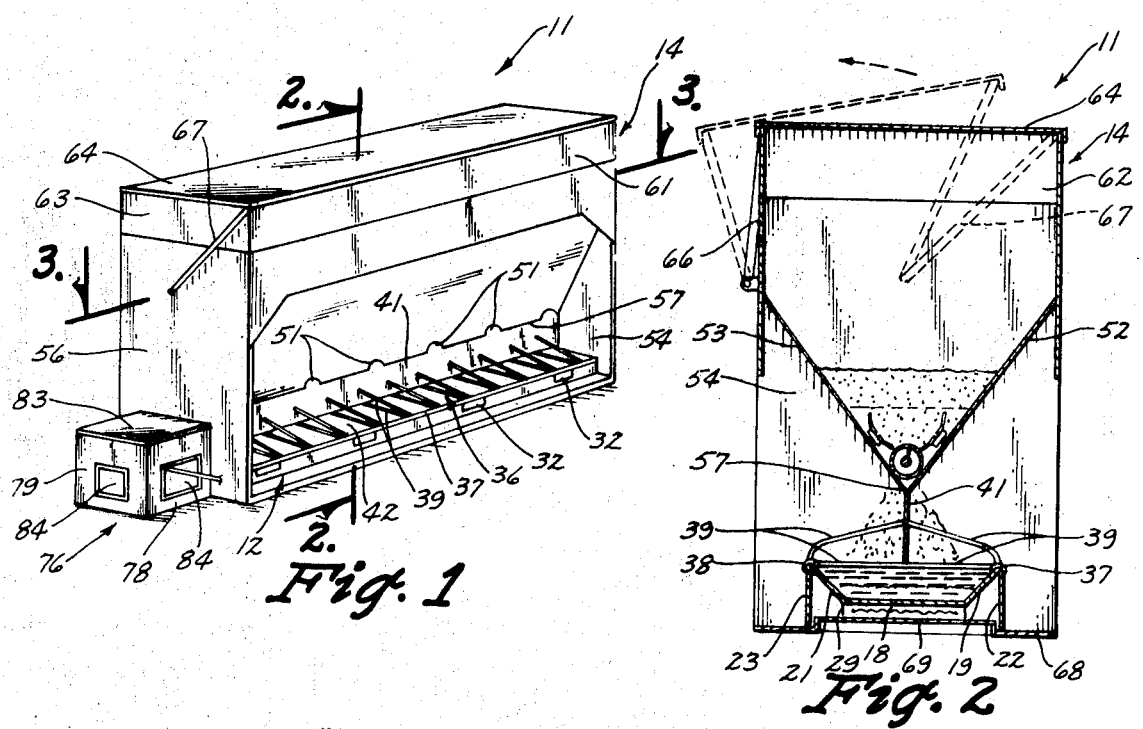
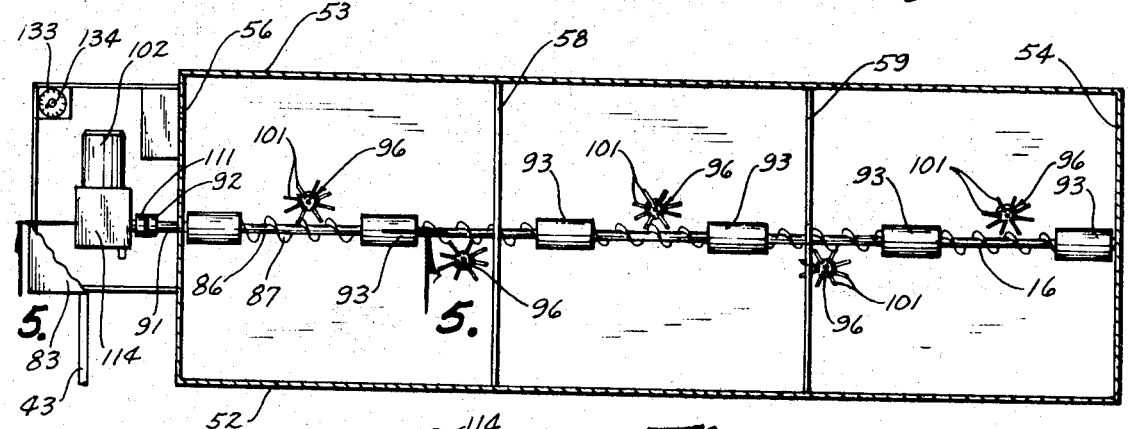
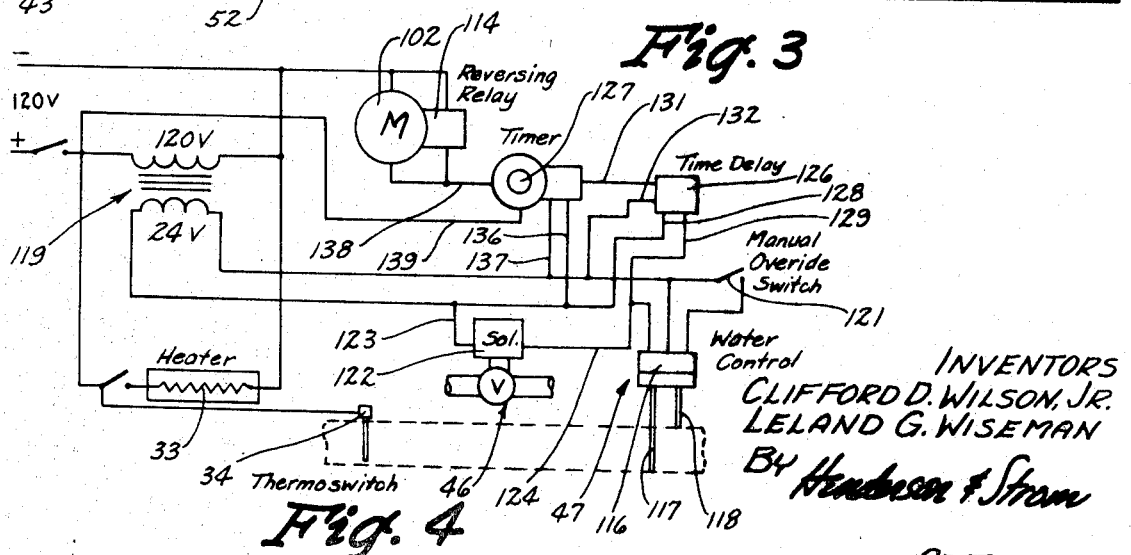

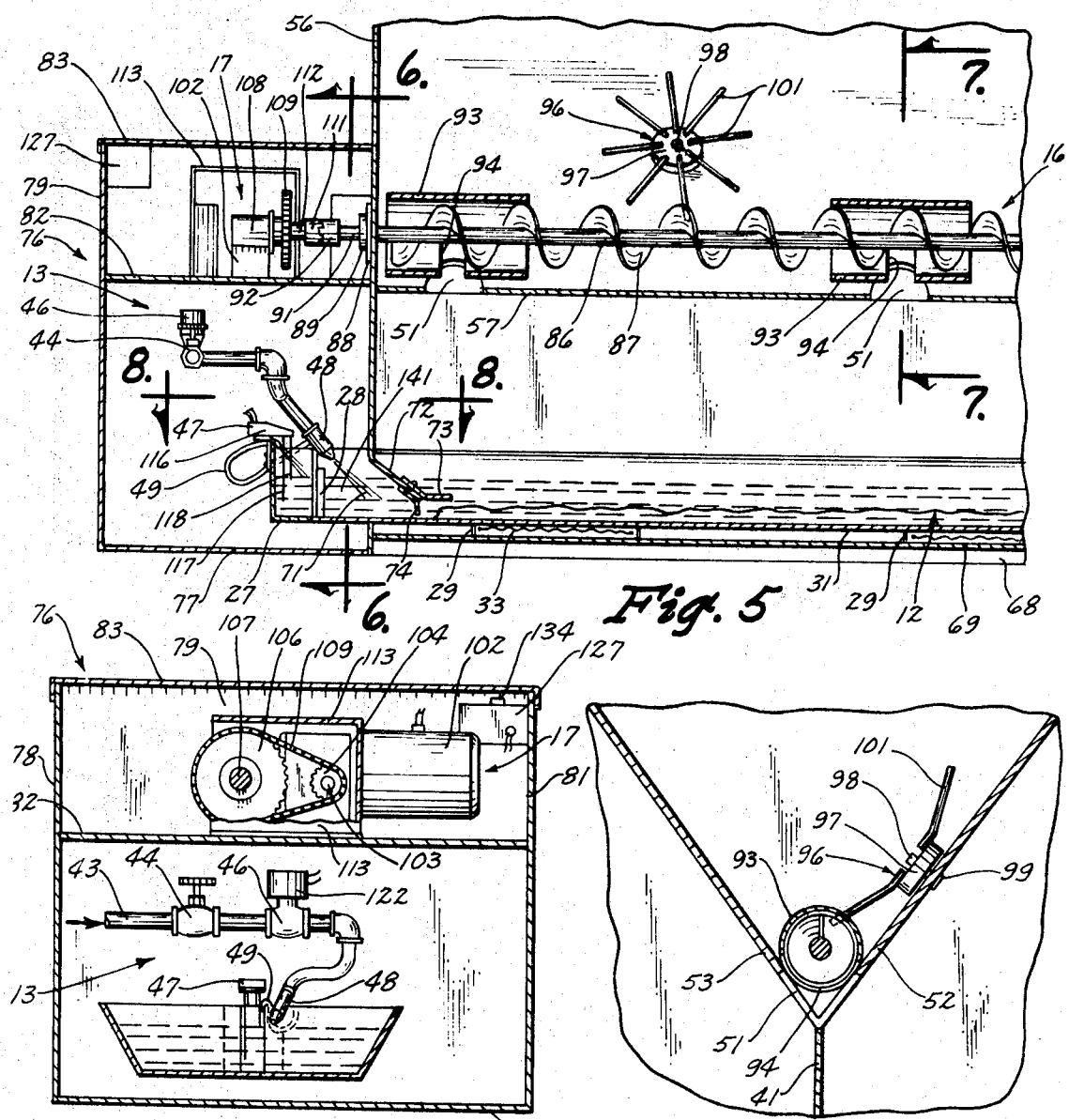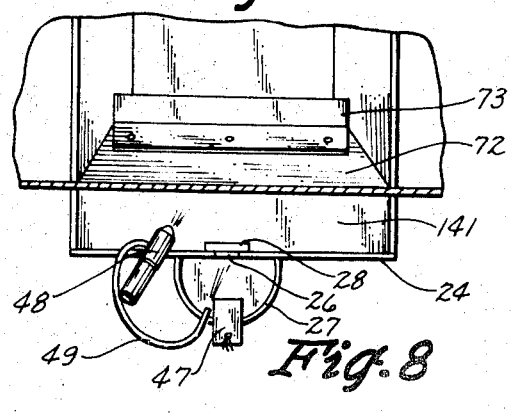

AUTOMATIC LIQUID FEEDING APPARATUS

BACKGROUND OF THE INVENTION

This invention relates generally to automatic liquid feeders which automatically measure and dispense predetermined amounts of water and feed into the same feeding trough.

Automatic bunk feeding of livestock, especially cattle, is not new. Specific methods of bunk feeding are illustrated in Holste et al., U.S. Pat. No. 3,339,529; Buschbom, U.S. Pat. No. 3,292,585; Chubbeck, U.S. Pat. No. 3,234,911; Rutter, U.S. Pat. No. 3,139,862; Reynolds, U.S. Pat. No. 2,794,576; and Chandler, U.S. Pat. No. 2,205,898. Methods for dispensing poultry feed and water into separate containers are disclosed in Wolfe, U.S. Pat. No. 2,782,760 and Wolfe, U.S. Pat. No. 2,701,548. The above described devices, however, are not adapted to automatically dispense predetermined amounts of water and feed into the same container or trough. (This method of feeding is usually called liquid feeding and is used primarily in feeding hogs). The above described devices are not equipped to measure and dispense varying amounts of feed and water under varying conditions. Additionally, the feed hoppers of these units may empty unevenly and sporadically because of bridging and packing of the feed contained therein.

SUMMARY OF THE INVENTION

This invention relates to an automatic feeding apparatus comprising trough means; water inlet means for directing water into the trough means; a feed hopper disposed above the trough means and having a feed outlet aperture formed therethrough; a rotatable means mounted in the feed hopper for moving feed to the outlet aperture; and a reversible drive means operatively connected to rotate the rotatable means, the drive means operating for a predetermined time interval in response to water in the trough means reaching a predetermined level. Time interval, as used herein, refers to a period of time during which the motor is rotating the rotatable means. In a preferred embodiment, a liquid level sensing means is disposed in the trough means and is designed to sense a minimum and maximum liquid level in the trough means. A flow control means is fluidly connected in the water inlet means to control the flow of water through the water inlet means; the flow control means being responsive to the liquid level sensing means. A regulating means is electrically and operatively connected to the liquid level sensing means and the reversible drive means; the regulating means being responsive to the liquid level sensing means and controlling the operation of the reversible drive means.

The advantages obtained with the improved feeding apparatus of this invention, especially when feeding hogs, are many. For example, feeding a mixture of water and feed (liquid feeding) to hogs provides a better feed conversion ratio than does dry feeding and carcass quality of the slaughtered hogs is markedly improved by liquid feeding. The solid feed can be finely ground for use in this feeding apparatus to obtain the highest feed conversion ratios, yet the ground feed, when fed in this liquid form, is not inhaled into the hog's respiratory system to cause respiratory problems. The feeding apparatus of this invention also requires only minimum amounts of labor as it is completely automatic and has very few moving parts thereby minimizing maintenance problems.

Another advantage of this feeding apparatus is that the direction of rotation of the auger is reversed from interval to interval which insures that the feed hopper will empty evenly and that the feed contained in the feed hopper will not bridge or pack. By changing the direction of rotation of the auger from interval to interval, stoppage of the feeding apparatus by foreign materials, e.g. corn cobs, corn stalks, etc., contained in the feed hopper is minimized.

Another advantage of this feeding apparatus is that it is capable of accurately measuring predetermined amounts of water and feed into the trough means. The ratio of feed to water can also be easily varied for varying conditions when utilizing the feeding apparatus of this invention. By using this feeding apparatus, for example, bred sows can be fed a diet having a high, water-to-feed ratio to control their weight during pregnancy while market hogs can be fed a diet having a high, feed-to-water ratio to cause a rapid weight increase.

BRIEF DESCRIPTION OF THE DRAWINGS

FIG. 1 is a perspective view of the automatic feeder of this invention;

FIG. 2 is a cross-sectional view of the automatic feeder taken along the line 2-2 of FIG. 1;

FIG. 3 is a cross-sectional view of the automatic feeder, partially broken away, taken along the line 3-3 of FIG. 1;

FIG. 4 is a schematic of the electrical system of the automatic feeder;

FIG. 5 is a cross-sectional view of the automatic feeder, partially broken away, taken along the line 5-5 of FIG. 3;

FIG. 6 is a cross-sectional view taken along the line 6-6 of FIG. 5 with the motor cover being partially broken away;

FIG. 7 is a cross-sectional view, partially broken away, taken along the line 7-7 of FIG. 5;

FIG. 8 is a cross-sectional view, partially broken away, taken along the line 8-8 of FIG. 5.

DESCRIPTION OF THE PREFERRED EMBODIMENTS

Referring now to the drawings, the automatic liquid feeder of this invention is indicated generally at 11 in FIGS. 1 and 2. The automatic liquid feeder comprises a trough means 12 (FIG. 1); a water inlet means 13 (FIG. 5) for directing water into the trough means 12; a feed hopper 14 (FIG. 2) disposed above the trough means 12; rotatable means 16 (FIG. 5) mounted in the feed hopper 14; and reversible drive means 17 (FIG. 5) operatively connected to rotate the rotatable means 16.

More specifically, the trough means (FIGS. 1 and 2) comprises a bottom panel 18, two inner sidewalls 19, 21 extending upwardly and obliquely of the bottom panel 18, two outer sidewalls 22, 23 depending from the uppermost portions of the inner sidewalls 19, 21 and two end walls 24 (FIG. 8—only one shown) connected to the bottom panel 18, the inner sidewalls 19, 21 and the outer sidewalls 22, 23. A vertical opening 26 (FIG. 8) is formed in one endwall 24. A semicircular section 27 is welded onto or otherwise rigidly attached to the endwall 24 and communicating with the trough means 12 through vertical opening 26. A rubber dam 28 is placed over the vertical opening 26 which allows water to flow out of semicircular section 27 but prevents feed from entering the semicircular section 27 from the trough means 12.

A plurality of heater enclosures 29 (FIG. 5) are rigidly affixed to the lower surface 31 of the bottom panel 18 of the trough means 12. Doors 32 (FIG. 1) are formed in the outer sidewalls 22, 23 to facilitate maintenance of the heaters 33 (FIG. 5) contained in the heater enclosures 29. The heaters 33 are electrically connected in a 120 volt circuit (FIG. 4) and are activated by a thermoswitch 34 disposed in the trough means 12. By utilizing the heaters 33, the liquid in trough means 12 can be maintained at the most appropriate temperature and can be kept from freezing during the winter months.

Feeding stall means generally indicated at 36 in FIG. 1 is comprised of two longitudinal members 37, 38 (FIGS. 1 and 2) juxtaposed of the juncture of inner sidewalls 19, 21 and outer sidewalls 22, 23. A plurality of struts 39 extend inwardly and normally of the longitudinal members 37, 38 and support a vertical baffle plate 41 above the longitudinal axis of the trough means 12. The struts 39 define individual feeding stalls 42 in the trough means 12. The vertical baffle plate 41 prevents feed loss when the feed is being transferred from the feed hopper 14 to the trough means 12.

The water inlet means 13 (FIGS. 5 and 6) comprises a water inlet pipe 43 fluidly connected to a suitable source of water, and a hand operable valve 44 and a flow control means 46 fluidly connected in the water inlet pipe 43. The hand operable valve 44 can be of any construction but is usually a gate valve or a globe valve. The flow control means 46 is generally a solenoid valve which controls the flow of water through the water inlet pipe 43 in response to a liquid level sensing means 47, explained in detail hereinafter.

The outlet end 48 (FIGS. 5 and 6) of water inlet pipe 43 is directed into the trough means 12 and is of a restricted diameter. The outlet end 48 is disposed above the maximum liquid level for the trough means 12 to render the water inlet means 13 nonsiphoning. A secondary outlet tube 49 is fluidly connected to the outlet end 48 of water inlet pipe 43 and is directed into semicircular section 27. Water emanating from outlet tube 49 washes feed from the semicircular section 27 into the trough means 12.

The feed hopper 14 (FIGS. 1 and 2) is disposed above the trough means 12. A plurality of feed outlet apertures 51 (FIGS. 1 and 5) are formed in the lowermost portion of the feed hopper 14 and are disposed over the trough means 12, and preferably, are vertically aligned with the longitudinal axis of the trough means 12. The baffle plate 41 is preferably vertically positioned directly below the feed outlet apertures 51.

The feed hopper 14, in cross section (FIG. 2), is of generally V-shaped configuration and is comprised of side panels 52, 53 and end panels 54, 56 affixed thereto (FIG. 1). The side panels 52, 53 converge inwardly at the lowermost portion of the feed hopper 14 and form an inverted apex 57 above the longitudinal axis of the trough means 12. The side panels 52, 53 are prevented from bowing outwardly due to the pressure of the feed contained thereby by restraining members 58, 59 (FIG. 3). The ends of the restraining members 58, 59 are attached to opposite side panels 52, 53.

Side panel extensions 61 (FIG. 1—only one shown) and end panel extensions 62, 63 (FIGS. 1 and 2) can be attached to the side panels 52, 53 and end panels 54, 56, respectively, of the feed hopper 14 in any known manner to increase the capacity of the feed hopper 14. A lid 64 is engageable with the top of the feed hopper 14 and is rotatably mounted by two vertical bars 66 and two inclined bars 67. The vertical bars 66 are rotatably mounted, at one end, to a side panel 53 and, at the other end, rotatably mounted on the lid 64. The inclined bars 67 are rotatably mounted, at one end, to an opposite end panel 54, 56 and, at the other end, rotatably mounted on the lid 64. The lid 64 can, thereby, be rotatably moved from the top of the feed hopper 14 to allow the filling thereof but the lid 64 can not be completely removed from the feed hopper 14.

The end panels 54, 56 extend downwardly of the inverted apex 57 and are affixed, as by welding, to a base panel 68 (FIGS. 2 and 5). A raised portion 69 is formed longitudinally in the base panel 68 to receive and secure the trough means 12.

One end panel 56 has a lateral opening 71 (FIG. 5) formed therein to receive the trough means 12. An ear 72 (FIGS. 5 and 8) extends obliquely inwardly from the uppermost portion of the lateral opening 71. An angle member 73 is attached to ear 72 by nut and bolt means and extends inwardly thereof while a lateral resilient dam 74 depends from ear 72. The dam 74 prevents feed from passing under the ear 72 while the angle member 73 prevents livestock from damaging the dam 74. Any feed that is forced under the dam 74 is washed back into the trough means 12 by water inlet means 13.

A housing generally indicated at 76 in FIGS. 1, 5 and 6 is attached to end panel 56. The housing 76 comprises, in combination, a bottom section 77, three side sections 78, 79, 81, a horizontal shelf 82 and a removable cover 83. Openings 84 are formed in the side sections 78, 79, 81 to facilitate maintenance of the components contained therein. The housing 76 protects the components contained therein and receives one end of the trough means 12.

The rotatable means 16 (FIGS. 3 and 5) is rotatably mounted in the feed hopper 14 and is adapted to move feed in the feed hopper 14 to the feed outlet apertures 51. Preferably, the rotatable means 16 is a substantially horizontally disposed auger 86 having helical flighting 87 disposed therearound. The auger 86 is mounted, proximate the ends thereof in journal boxes 88 (FIG. 5) formed in the end panels 54, 56 of the feed hopper 14. The journal boxes 88 are generally fitted with bearings 89 to facilitate rotation of the auger 86 about its longitudinal axis. One end 91 of the auger 86 projects through the end panel 56 and has fitted thereon a notched coupling 92.

Cylindrical guideways 93 (FIGS. 5 and 7) are attached to the inside of the feed hopper 14 and vertically aligned with the feed outlet apertures 51 formed along the inverted apex 57. The cylindrical guideways 93 are open at both ends and each guideway 93 has a feed outlet opening 94 formed therein. The feed outlet openings 94 are aligned with the feed outlet apertures 51 formed in the feed hopper 14. The guideways 93 are disposed about the auger 86; each of the guideways 93 having an inside diameter slightly larger than the outside diameter of the helical flighting 87 around the auger 86. The guideways 93 prevent feed from flowing through the feed outlet apertures 51 when the auger 86 is stationary.

A plurality of feed agitator wheels 96 (FIGS. 5 and 7) are rotatably mounted on the side panels 52, 53 of the feed hopper 14. Each of the feed agitator wheels 96 are comprised of a center cylindrical portion 97 having a shaft 98 passing through the center thereof. The shaft 98 is mounted in a journal box 99 formed in the side panels 52, 53 of the feed hopper 14. A plurality of arms 101 of equal length radiate outwardly of the center cylindrical portion 97 and extend arcuately outwardly of the side panels 52, 53. The feed agitator wheels 96 are so positioned that at least one of the arms 101 extends inwardly of the outside diameter of the helical flighting 87 of the auger 86. Therefore, when the auger 86 is rotated about its axis, the arms 101 are engaged by the flighting 87 and the feed agitator wheels 96 are rotated about their respective axes. The feed agitator wheels 96 are specially designed to prevent packing and bridging of the feed in the feed hopper 14.

The reversible drive means 17 (FIGS. 5 and 6) is mounted on the horizontal shelf 82 of the housing 76 and is operatively connected to rotate the rotatable means 16. The drive means 17 operates for a predetermined time interval in response to water in the trough means 12 reaching a predetermined level.

The drive means 17 (FIGS. 5 and 6) is comprised of an electric motor 102 which is electrically connected to a suitable source of electricity and which has a drive shaft 103 extending therefrom. A drive gear 104 is affixed to the drive shaft 103 through its center, and normally of the drive shaft 103. A second gear 106 of a larger diameter is affixed normally and through its center to a shaft 107 mounted in journal box 108. A chain 109 translates rotation of the drive gear 104 to the second gear 106. The shaft 107 has a notched coupling 111 mounted on one end 112 thereof which mates with notched coupling 92. The motor 102 and other moving parts are surrounded by a motor cover 113.

The motor 102 is equipped with a reversing relay 114 (FIG. 4) and a centrifugal switch (not shown). The reversing relay 114 is electrically connected to the motor 102 and causes the direction of rotation of the auger 86, during any time interval, to be in a direction opposite that of the immediately preceding time interval. As the motor 102 generally operates for only short periods of time, the direction of rotation of the auger 86 is reversed often thereby minimizing bridging and packing of the feed in the feed hopper 14.

The centrifugal switch (not shown) is electrically and operatively connected to the reversing relay 114 and the motor 102. Under normal conditions, the centrifugal switch is not activated. However, if an obstruction, e.g., corn cobs, corn stalks, becomes lodged in the auger 86, the centrifugal switch will prevent a complete shutdown of the feeder 11. When the normal number of revolutions per minute of the motor 102 and the auger 86 are reduced to a predetermined number due to obstruction of the auger 86 as described above, the centrifugal switch activates the reversing relay 114 which reverses the direction of rotation of the motor 102 and the auger 86. The obstruction is then forced outwardly of the auger 86 and clogging of the automatic feeder 11 is thereby prevented. Without this centrifugal switch and concomitant automatic reversing feature, the farmer might be required to completely empty the feed hopper 14, remove the obstruction, and then refill the feed hopper 14 with attendant loss of time and money.

The liquid level sensing means 47 (FIGS. 4 and 5) is disposed in the trough means 12 and is capable of sensing a minimum and maximum liquid level. The liquid level sensing means 47 is further capable of transmitting this information to other components of the automatic liquid feeder 11 to render the feeder 11 capable of automatic operation.

As shown in FIGS. 4 and 5, the liquid level sensing means 47 comprises a solid state electronic body 116, a long probe 117, and a short probe 118. Both probes 117, 118 depend from the body 116 and are of adjustable length. The long probe 117 senses a minimum liquid level in the trough means 12 and transmits this information as explained hereinafter. The short probe 118 senses a maximum liquid level and also transmits this information. The body 116 is affixed within the semicircular section 27 of the trough means 12 and the probes 117, 118 depend therefrom.

The liquid level sensing means 47 is electrically and operatively connected into a 24 volt circuit to insure safe operation of the feeder 11. The line voltage is reduced to 24 volts by transformer 119 (FIG. 4).

A manual override switch 121 is electrically connected in the 24 volt circuit and is capable of overriding the responses emitted by the liquid level sensing means 47. Therefore, manual adjustment of the liquid level in the trough means 12 can be made at any time.

The flow control means 46 (FIG. 4) is fluidly connected in the water inlet means 13 and controls the flow of water through the water inlet means 13 in response to the liquid level sensing means 47. The flow control means 46 (FIGS. 4 and 6) is a solenoid valve 122 which is electrically and operatively connected in the hereinbefore described 24 volt circuit with the liquid level sensing means 47 by leads 123 and 124. The solenoid valve 122 is automatically opened in response to the completion of the 24 volt circuit by the liquid level sensing means 47 when the liquid level in the trough means 12 drops below the end of the long probe 117. The trough means 12 then begins to fill with water from the water inlet means 13. When the water in the trough means 12 reaches the bottom of the short probe 118, the liquid level sensing means 47 breaks the 24 volt circuit to the solenoid valve 122 (lead 124 is then a dead wire) and the solenoid valve 122 closes. A predetermined amount of water is, therefore, measured into the trough means 12 during each cycle.

A time delay switch 126 is also electrically connected in the 24 volt circuit between the solenoid valve 122 and a regulating means 127. The time delay switch 126 preferred for use herein is a two contact, bimetallic switch. Leads 128 and 129 connect the switch 126 electrically when the solenoid valve 122 is operating. Electricity passing through the bimetallic member (not shown) causes it to bend due to uneven expansion of the metals. Electricity must pass through the bimetallic member for several seconds, e.g. 20 seconds, before the circuit is completed through the regulating means 127 by leads 131, 132, thereby activating the regulating means 127.

The regulating means 127 is electrically connected in the 120 volt circuit to the electric motor 102 and is electrically connected in the 24 volt circuit, through the time delay switch 126, to the liquid level sensing means 47. The regulating means 127 is responsive to the liquid level sensing means 47 and controls the operation of the drive means 16.

The regulating means 127 (timer mechanism) has a dial face 133 and a timing knob 134 (FIG. 3). The knob 134 can be set, by hand, for time intervals ranging from two seconds to ninety seconds. When the time interval, i.e., the period of rotation of the auger 86, is increased, the feed-to-water ratio is also increased. When the liquid in the trough means 12 recedes below the bottom of the long probe 117, the solenoid valve 122 is opened. After several seconds, e.g. about 20 seconds, the bimetallic member bends sufficiently and completes the circuit through the timer mechanism and, thereby, resets a clutch (not shown) in the timer mechanism 127, and starts a small electric motor (not shown) which operates the timer mechanism 127. The motor drives the timer mechanism 127 when the clutch is released from its reset position. When the solenoid valve 122 closes, the bimetallic member begins to return to its normally open position and thereby releases the clutch. The 24 volt circuit is completed through the timer mechanism 127 by the leads 136, 137 and the time interval begins. At this same moment, the circuit through the regulating means 127 and the motor 102 is completed through two leads 138, 139. The motor 102 starts and rotates the auger 86 until the knob 134 returns to zero. The motor 102 is then stopped and the cycle begins anew. It should also be pointed out that the reversing relay 114 reverses the direction of rotation of the motor 102 from time interval to time interval.

The time delay switch 126 is utilized herein as an operating precaution. If feed causes temporary blockage at the water inlet end 141 (FIGS. 5 and 8) of the trough means 12, water from the water inlet means 13 will quickly rise up to the short probe 117 and close the solenoid valve 122. However, the timer mechanism 127 will not be reset unless the solenoid valve 122 is retained in an open position for at least the time required for the bimetallic member to bend, e.g. 20 seconds, (as explained hereinbefore) and, therefore, feed will not be dispensed into the trough means 12. Therefore, the solenoid valve 122 will reopen and water therefrom will wash feed away from the water inlet end 141 of the trough means 12.

OPERATION

To properly utilize the automatic feeder 11 of this invention, feed, preferably finely ground, is placed in the feed hopper 14. When the electrical components are properly connected with a suitable source of electricity, the flow control means 46 (solenoid valve 122) opens in response to the liquid level sensing means 47. Water is introduced into trough means 12 through the water inlet means 13. The timer mechanism 127 is automatically set as hereinbefore described. When the water level reaches the bottom of the short probe 118, the solenoid valve 122 is automatically closed and the motor 102 is started which rotates the auger 86. Feed is thereby dispensed into trough means 12. At the end of the time cycle, the timer mechanism 127 automatically stops the motor 102. The reversing relay 114 automatically reverses the direction that the motor 102 will rotate just prior to the time that the motor 102 is started.

The entire cycle begins again when the liquid level (water plus feed) is reduced below the end of the long probe 117.

Although a preferred embodiment of this invention has been described hereinbefore, it is to be remembered that various modifications may be made herein without departing from the invention as defined in the appended claims.

We claim:

1. An automatic liquid feeding apparatus comprising:
   trough means;
   water inlet means for directing water into said trough means;
   a feed hopper disposed above said trough means and having a feed outlet aperture formed therethrough; said feed outlet aperture being disposed over said trough means;
   an auger mounted in said feed hopper and substantially horizontally disposed, said auger being adapted to move feed in said feed hopper to said feed outlet aperture; and
   reversible drive means operatively connected to rotate said rotatable means; said drive means operating for a predetermined time interval in response to water in said trough means reaching a predetermined level; said reversible drive means, during a time interval, rotating said auger in a direction opposite to the direction of rotation of said auger during the immediately preceding time interval.

2. The feeding apparatus of claim 1 wherein:
a liquid level sensing means is disposed in said trough means; said sensing means being capable of sensing a minimum liquid level and a maximum liquid level; and
a flow control means is fluidly connected in said water inlet means; said flow control means controlling the flow of water through said water inlet means in response to said liquid level sensing means.

3. The feeding apparatus of claim 2 wherein:
a regulating means is operatively connected to said liquid level sensing means and said drive means; said regulating means being responsive to said liquid level sensing means and controlling the operation of said drive means.

4. The apparatus of claim 3 wherein said regulating means is a timer mechanism adjustable for varying time intervals; said timer mechanism, in response to said liquid level sensing means, starting said reversible drive means, allowing said reversible drive means to operate for a predetermined time interval and stopping said reversible drive means at the end of said time interval.

5. The apparatus of claim 4 wherein said timer mechanism starts said reversible drive means when said liquid level sensing means senses the maximum liquid level.

6. The apparatus of claim 5 wherein a time delay switch is operatively connected to said liquid level sensing means and said timer mechanism;
said timer mechanism responding to said liquid level sensing means through said time delay switch.

7. The apparatus of claim 6 wherein said flow control means is automatically opened when said liquid level sensing means senses the minimum liquid level and said flow control means is automatically closed when said liquid level sensing means senses the maximum liquid level.

8. The apparatus of claim 7 wherein a cylindrical guideway having an inside diameter slightly larger than the outside diameter of said auger is disposed around said auger; said cylindrical guideway having a feed outlet opening formed through the sidewall thereof; said feed outlet opening being aligned with said feed outlet aperture of said feed hopper; said cylindrical guideway being attached to said feed hopper.

9. The apparatus of claim 8 wherein feed agitator wheels are mounted in said feed hopper; said agitator wheels having a plurality of arms of equal length radiating outwardly, at least one of said arms extending inwardly of the outside diameter of the auger, whereby when said auger is rotated about its axis, said agitator wheels are rotated about their respective axes.

10. The apparatus of claim 9 wherein the reversible drive means is operatively connected to a centrifugal switch; said centrifugal switch sensing the revolutions per unit time of said auger and automatically reversing said drive means when the revolutions per unit time of said auger are reduced to a predetermined number of revolutions per unit time.

11. The apparatus of claim 10 wherein:
said flow control means is a solenoid valve; and
said feed hopper is V-shaped and a plurality of feed outlet apertures are formed in the lowermost portion of said feed hopper.

12. The apparatus of claim 11 wherein baffle plates are vertically disposed directly below said outlet apertures of said feed hopper; said baffle plates being affixed to said trough means.